United States Patent
Rolling et al.

(10) Patent No.: US 6,456,385 B1
(45) Date of Patent: Sep. 24, 2002

(54) SYSTEM FOR ADDING SOFT FONTS TO A PRINTER DATA STREAM

(75) Inventors: Patrick Rolling, Cheshire, CT (US); John J. Serra, Monroe, CT (US)

(73) Assignee: Pitney Bowes Inc., Stamford, CT (US)

(*) Notice: Subject to any disclaimer, the term of this patent is extended or adjusted under 35 U.S.C. 154(b) by 0 days.

(21) Appl. No.: 09/461,575

(22) Filed: Dec. 15, 1999

(51) Int. Cl.[7] .............................................. G06F 15/00
(52) U.S. Cl. ..................... 358/1.11; 358/1.18; 382/317; 707/467; 707/542
(58) Field of Search ........................... 358/1.11; 382/317

(56) References Cited

U.S. PATENT DOCUMENTS

| | | | | |
|---|---|---|---|---|
| 5,579,449 A | * | 11/1996 | Strobel ....................... | 358/1.11 |
| 5,628,249 A | * | 5/1997 | Cordery et al. ............... | 101/91 |
| 5,684,706 A | * | 11/1997 | Harman et al. ............. | 700/219 |

* cited by examiner

*Primary Examiner*—Edward Coles
*Assistant Examiner*—Alan Rahimi
(74) *Attorney, Agent, or Firm*—Ronald Reichman; Paul Levitsky; Angelo Chaclas

(57) ABSTRACT

A system and corresponding method for use when an application prints a document and a corresponding envelope is printed by an independent process, unknown to the application, using soft fonts (dynamic fonts). The system allows creation of a mail piece, which generally consists of document pages and an envelope; the pages to be printed according to data and layout specified in a pages file and using a pages font as indicated in the pages file; and the envelope to be printed with address information extracted from the pages file according to instructions specified in an envelope template file. The instructions of the envelope template file include a layout and a dynamic envelope font, such as a true type font. The system includes a printer driver, responsive to a call to prepare to start printing the pages of the mail piece and in turn for obtaining from the envelope template file the envelope font. The printer driver is further responsive to a call to realize the pages font, for realizing the pages font and for realizing the envelope font. The printer driver is further responsive to a first page of pages data, for providing the first page of pages data to an I/O port interface, and for downloading the envelope font and providing the envelope data including the envelope font to the I/O port interface. The printer driver is further responsive to the remaining pages data, and for providing the remaining pages data to the I/O port interface.

3 Claims, 2 Drawing Sheets

SYSTEM FOR ADDING SOFT FONTS TO A PRINTER DATA STREAM

TECHNICAL FIELD

The present invention pertains to the use of so-called soft fonts or true type fonts by applications running an operating system of a data processing system. More particularly, the invention relates to creation of true type fonts for a printer that is other than the printer selected by an application running in a MICROSOFT (R) WINDOWS (R) operating system or similar environment.

BACKGROUND OF THE INVENTION

Sometimes in creating a mail piece, including an envelope and also pages to be inserted in the envelope, the address for the mail piece is included in the computer file that is printed as the pages of the mail piece. It is thus advantageous to have the address information automatically extracted from the computer file storing the pages of the mail piece for printing the envelope. The prior art includes some mail systems that do this. In such a system, both the pages of a mail piece, as well as the corresponding envelope, can be printed by the user issuing a single command, "print file." The layout of the envelope is usually provided in a separate envelope template file.

The prior art teaches various such mail merge systems, and even provides a system in which one printer is used to print the document pages of a mail piece, and another is used to print the envelope. In such a two-printer system for creating mail pieces (based on a word processing application), with the two printers connected to a single input/output (I/O) of a personal computer, both the document pages of the mail piece and the envelope are printed in response to a single "print file" command. Upon receiving such a command (from a user), the word processing application provides a data stream that includes the data to be printed as the document pages (along with formatting commands, which might specify one or more true type fonts), and also the data to be printed to the envelope (using the layout provided in the envelope template file).

In such a two-printer mail merge system (whether or not the printers are of differing kinds), using so-called true type fonts is problematic with the MICROSOFT WINDOWS operating system or a similar operating system or environment (such as MICROSOFT WINDOWS 3.1). The advantage of a true type font is that it can be scaled (by the operating system) to meet the needs of a document, which is easier than designing a document based on available hard fonts, i.e. fonts that can be printed in only various predetermined sizes.

Using true type fonts is problematic because of how true type fonts are dynamically created. A true type font is used by an application only after it is first realized, i.e. after instructions for printing the font characters are generated by a printer driver called by the operating system (using information about the font stored on the computer hosting the application). Before realizing a font, a so-called device context must be created, i.e. the operating system must be made to expect that a true type font is to be created. The device context is associated with the selected printer, in the sense of the WINDOWS operating system, i.e. the printer that is selected using the WINDOWS menu system to print a file. Under the WINDOWS operating system, it is normally not possible to create true type fonts by a process other than that of the application (word processor) initiating the printing job.

Thus, what is needed is a method and system in a WINDOWS or similar operating system or environment, of creating (realizing) a true type font using a process other than the that of the application initiating printing of the document pages of a mail piece so as to be able to print an associated envelope using the true type font (dynamic font).

SUMMARY OF THE INVENTION

Accordingly, the present invention provides a system and corresponding method for creating a mail piece consisting of document pages and an envelope. The pages are printed according to data and layout specified in a pages file and using a pages font as indicated in the pages file; the corresponding envelope is printed with address information extracted from the pages file according to instructions specified in an envelope template file; the instructions include a layout and an envelope font that is a dynamic font. The system includes a printer driver that is responsive to a call, made by the application used to create the pages of the mail piece, to prepare to start printing the pages of the mail piece and in turn for obtaining the envelope text from the envelope template file. The printer driver is further responsive to a call (from the application) to realize the pages font; the printer subsequently realizes the pages font and the envelope font. The printer driver is further responsive to a first page of pages data, which the printer driver subsequently provides to an I/O port interface, while downloading the envelope font and providing the envelope data (including the envelope font) to the I/O port interface. Finally, the printer driver is responsive to the remaining pages data, which is then provided to the I/O port interface.

The present invention is of particular use in those instances where one or two printers are connected to the I/O port interface, so long as the envelope template file specifies that a true type font is to be used in printing the envelope. In an embodiment where two printers are connected, so that the pages of the mail piece print on one printer and the envelope prints on the other, the printer controller of one of the printers is specially adapted to regulate the flow of the stream of printing instructions being provided by the printer driver through the I/O port interface.

BRIEF DESCRIPTION OF THE DRAWINGS

The above and other objects, features and advantages of the invention will become apparent from a consideration of the subsequent detailed description presented in connection with accompanying drawings, in which.

DETAILED DESCRIPTION

The present invention will now be described for use with a system including two printers attached to a single input/output (I/O) port interface of a personal computer. However, as further detailed below, it should be understood that an alternative embodiment of the present invention can be utilized in a system including only a single printer.

Figure 1:
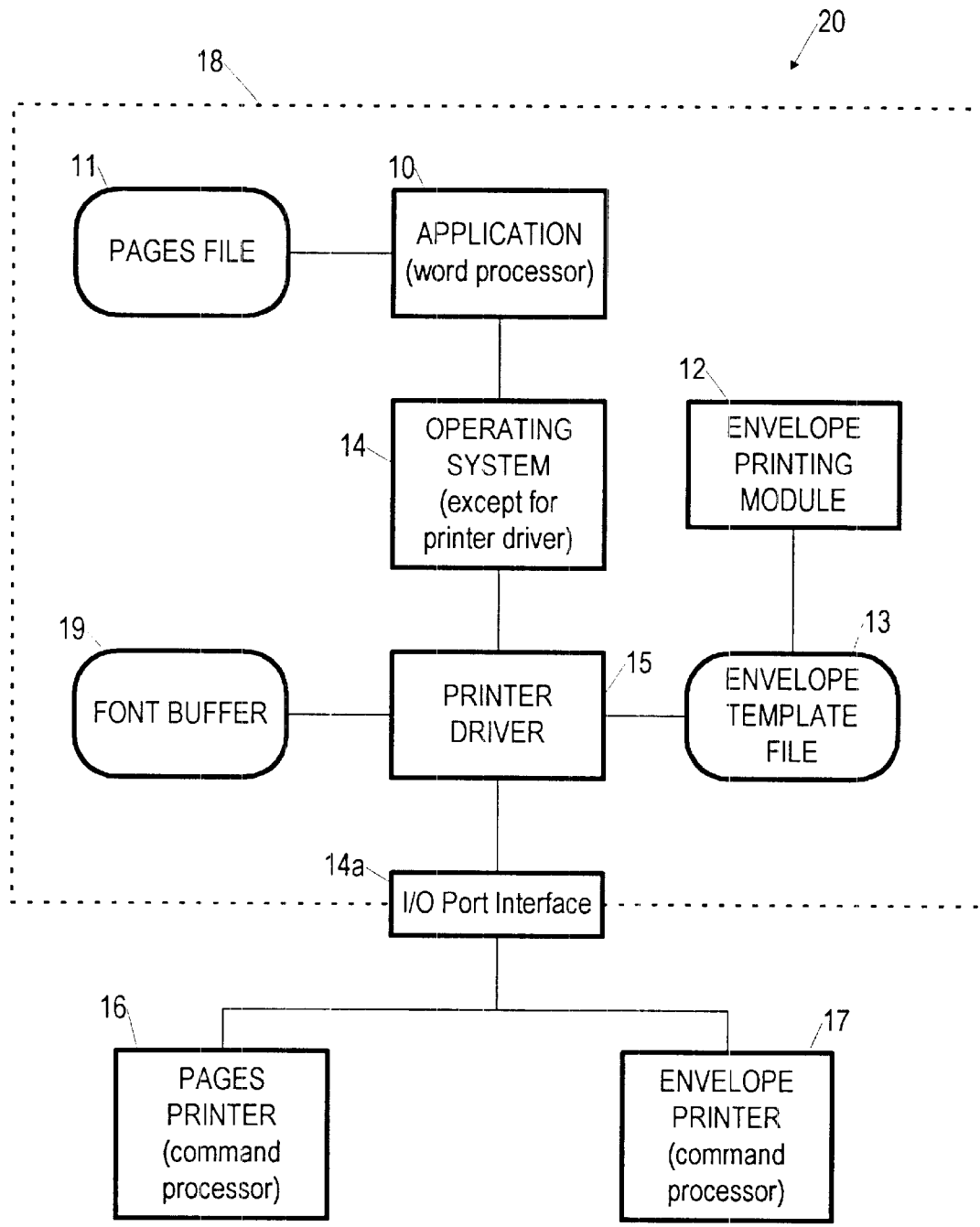
FIG. 1 is a block diagram of a system for which the method of the present invention is intended.

Referring now to FIG. 1, a mail piece (envelope and document or insert pages to be inserted into the envelope) creation system 20, according to the present invention, is shown as including an application 10, which can be any of various commercially available word processing applications that run under an operating system 14 such as the MICROSOFT WINDOWS operating system, or a similar operating system or environment; an envelope printing module 12, which runs independently of the application 10 and is used to create instructions for printing the envelope; a printer driver 15 specially adapted to the function of the present invention as described below; a page printer 16 and an envelope printer 17.

Components 10–15 and 19 of the mail piece creation system 20 are hosted by a personal computer 18. To interface each of the printers 16 and 17 to the printer driver 15, the mail piece creation system 20 also includes a single I/O port interface 14a of the host personal computer 18. A peripheral Y-type connector can be used to plug the two different printers into the single I/O port. Thus, a single print stream is used to convey both the envelope data and the pages data from the printer driver 15 to the printers 16 and 17 through the I/O port interface 14a, the print stream including all of the data and printer control language printing instructions needed to print both the page(s) and the envelope of the mail piece. The printer control language used is specially adapted to include the ability to allow instructions to specify at what point (in the print stream) to divert the print stream from one printer to another. The print stream is created by the printer driver 15 from the printing instructions provided by the application 10 and obtained from the envelope template file 13. The envelope template file is created (independently of the process of printing the pages and the envelope) by using the envelope printing module 12.

An alternative embodiment of the present invention can be utilized with single printer applications, as long as the envelope template file calls for use of a true type font, because the application and the envelope printing module are not coupled. In principle, if the envelope module could determine what true type fonts are to be used to print the pages of the mail piece, and no additional true type fonts are needed to print the envelope, then the present invention would not be needed to realize the envelope fonts.

The mail piece creation system 20 produces the document pages of a mail piece based on the content of a pages file 11 (a data file for the application 10); the content includes what is to be printed, as well as formatting instructions (i.e., both the fonts and the layouts to be used). The system prints to the envelope based on address information extracted from the pages file 11 and based on layout and font instructions (i.e. format instructions) included in an envelope template file 13.

If the fonts specified in the pages file are different than those specified in the envelope template file, and if they are true type fonts (which are created dynamically), then since under the WINDOWS operating system (or similar operating systems or environments) the fonts can be realized only by the application 10; the printer driver 15 will not have the fonts it needs to print the envelope. (If the fonts to be used for printing the envelope are not true type fonts, then they can be included in a font buffer 19 at any time before printing a mail piece and thus made available to the printer driver 15.)

Figure 2:
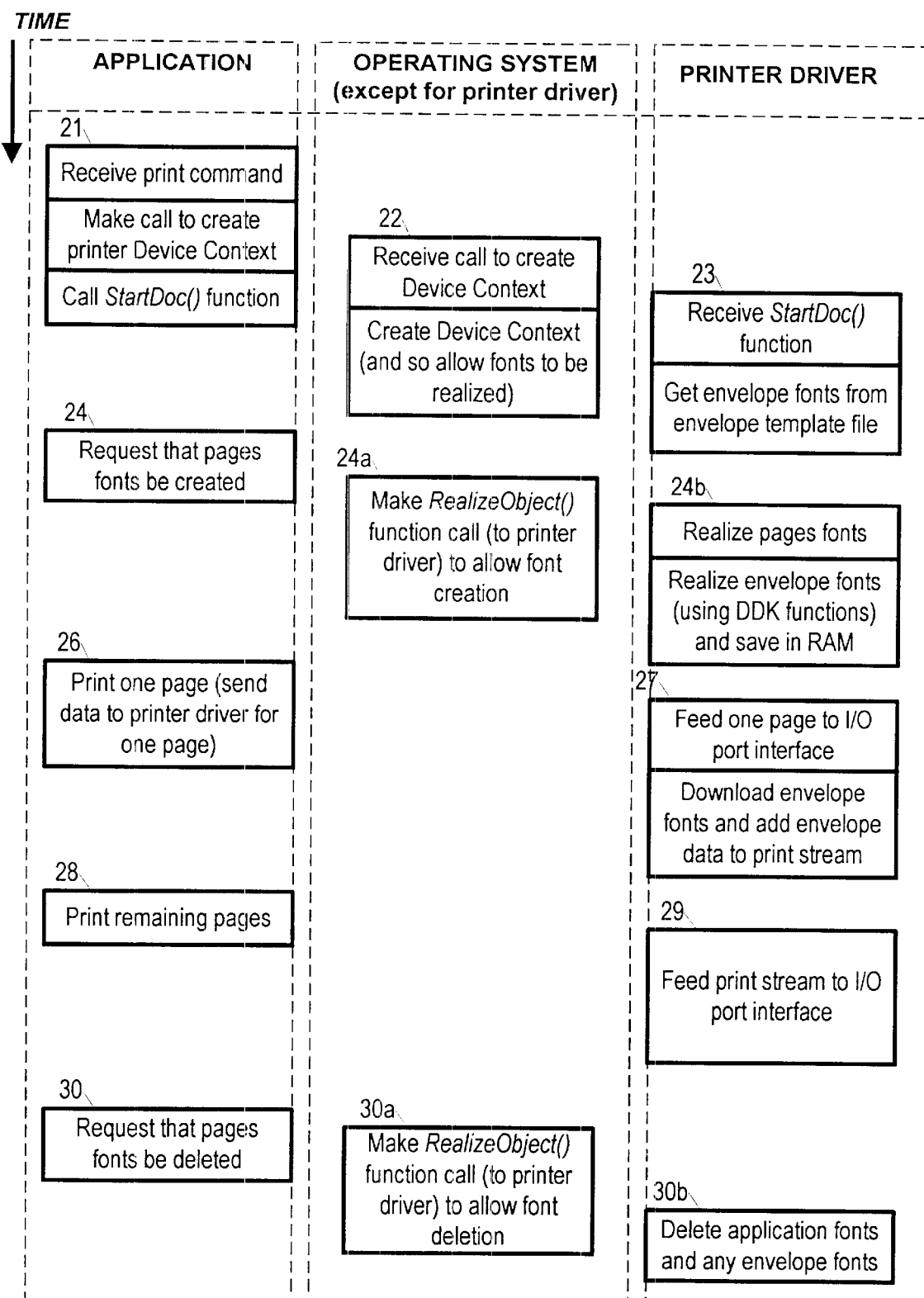
FIG. 2 is a flowchart showing the method of the present invention.

Referring now to FIG. 2, the method of the present invention is shown as beginning with a step 21 in which the application 10 receives a print command. Here the user, in the case of the MICROSOFT WORD application, has selected from a menu the command, "Print file." In response, the application makes a call to create a printer device context, which allows soft fonts to be created for printing.

After making the call to create a device context, the application executes a StartDoc( ) function call in order to begin printing the mail piece.

When the application makes the call to create a printer device context, the operating system, in a step 22, receives the call and creates the device context, allowing fonts to be realized. The application creates the device context through the socalled WINDOWS graphic device interface (GDI).

With the device context created, the application, in a step 24, then requests that the page fonts be realized. In response, in a step 24a, the operating system GDI translates the request into a RealizeObject( ) function call to the printer driver 15 to arrange for font creation.

Before receiving the RealizeObjecto call from the operating system 14, in response to the StartDoco function call made by the application 10, the printer driver 15 examines the envelope template file to determine what fonts are to be used to print the envelope. Then, in a step 25, in response to the RealizeObject( ) function call by the operating system GDI, the printer driver 15 realizes the pages fonts, and also realizes the envelopes fonts. In the preferred embodiment, the printer driver 15 realizes the envelopes fonts using so-called device driver kit (DDK) functions available with the MICROSOFT WINDOWS operating system, and saves the envelope fonts in the font buffer 19, which is preferably a location in the RAM of the device hosting the printer driver 15.

Next, in a step 26, the application prints the first page of the mail piece pages (on the way to printing all of the mail piece pages without another print command being issued by the user), and in response, the printer driver, in a step 27, downloads the envelope fonts it realized for the envelope (from the font buffer 19) and inserts the envelope fonts and the envelope data and layout into the print stream. Then in a step 28, the application 10 prints the remaining pages of the mail piece, and the printer driver 15, in a step 29, feeds the print stream to the I/O port 14a. The print stream arrives at a printer controller in one of the printers, called the master printer, that is specially adapted to understand the (proprietary) printer control language, including the instructions to divert the print stream to the other, slave printer and to halt the diversion to continue printing on the slave printer, thereby enabling printing the pages printer 16 to print the pages of the mail piece, and the envelope printer 17 to print the envelope of the mail piece, the envelope being printed after the first page of the pages of the mail piece.

Finally, in a step 30, the application requests that the pages font be deleted, and in response the operating system 14, in a step 31, makes a RealizeObject( ) function call to the printer driver 15 to arrange for font deletion. The printer driver 15, in a step 32, then deletes the application fonts and any envelope fonts that may have been created.

As is apparent from the above description, the present invention will also be of use if only a single printer 16 is attached to the host personal computer 18 through the I/P port interface 14a, and the single printer is used to print both the pages of a mail piece and its corresponding envelope, as long as the fonts used for printing the envelope are true type fonts.

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A system for creating a mail piece, the mail piece consisting of one or more pages and an envelope, the one or more pages to be printed according to data and layout specified in a pages file and using a pages font as indicated in the pages file, the envelope to be printed with address information extracted from the pages file according to instructions specified in an envelope template file, the instructions including a layout and an envelope font that is a dynamic font, the system comprising:

a) an application, responsive to the pages file and to inputs from a user, including a print command, for:
      i) providing a call to create a printer device context;
      ii) for providing a call to prepare to start printing the pages of the mail piece;
      iii) for providing a request that the pages font be created;
      iv) for providing a request to print one page of the pages;
      v) for providing a request to print the remaining pages; and
      vi) for providing a request to delete the pages font;
   b) an operating system, wherein the operating system is:
      i) responsive to the call to create a device context, and in turn for creating a device context;
      ii) responsive to the request that the pages font be created, and in turn for making a call to realize the pages font;
      iii) responsive to the request to delete the pages font, and in turn for making a call to delete the pages font; and
   c) a printer driver, wherein the printer driver is responsive to the call to prepare to start printing the one or more pages of the mail piece and in turn for obtaining from the envelope template file the envelope font;
      i) further responsive to the call to realize the pages font, for realizing the pages font and for realizing the envelope font;
      ii) further responsive to a first page of pages data, for providing the first page of pages data to an I/O port interface and for downloading the envelope font and providing the envelope data including the envelope font to the I/O port interface; and
      iii) if there are more than one page of pages data, then the printer driver is further responsive to the remaining pages data, and for providing the remaining pages data to the I/O port interface.

2. A printer driver for use creating a mail piece, the mail piece consisting of pages and an envelope, the pages to be printed according to data and layout specified in a pages file and using a pages font as indicated in the pages file, the envelope to be printed with address information extracted from the pages file according to instructions specified in an envelope template file, the instructions including a layout and an envelope font that is a dynamic font, wherein the printer driver is:

a) responsive to a call to prepare to start printing the pages of the mail piece and in turn for obtaining from the envelope template file the envelope font;
   b) further responsive to a call to realize the pages font, for realizing the pages font and for realizing the envelope font;
   c) further responsive to a first page of pages data, for providing the first page of pages data to an I/O port interface and for downloading the envelope font and providing the envelope data including the envelope font to the I/O port interface; and
   d) further responsive to the remaining pages data, for providing the remaining pages data to the I/O port interface.

3. A method for creating a mail piece, the mail piece consisting of pages and an envelope, the pages to be printed according to data and layout specified in a pages file and using a pages font as indicated in the pages file, the envelope to be printed with address information extracted from the pages file, according to instructions specified in an envelope template file, the instructions including a layout and an envelope font that is a dynamic font, the method comprising the steps of:

a) in responsive to a call to prepare to start printing the pages of the mail piece, obtaining from the envelope template file the envelope font;
   b) in responsive to a call to realize the pages font, realizing the pages font and realizing the envelope font;
   c) in response to a first page of pages data, providing the first page of pages data to an I/O port interface and for downloading the envelope font and providing the envelope data including the envelope font to the I/O port interface; and
   d) in response to any remaining pages data, providing the remaining pages data to the I/O port interface.

* * * * *